United States Patent [19]
Fels, Jr.

[11] Patent Number: 6,011,097
[45] Date of Patent: Jan. 4, 2000

[54] PAINTING MEDIUM FOR ARTISTS

[76] Inventor: Donald C. Fels, Jr., 111 Quesenburry St., Apt. 8, Hillsville, Va. 24343

[21] Appl. No.: 09/105,914

[22] Filed: Jun. 26, 1998

[51] Int. Cl.$^7$ .............................. C08L 91/00; C09D 5/06; C09D 191/00
[52] U.S. Cl. ............................ 524/313; 106/252; 106/253
[58] Field of Search ..................................... 524/270, 313; 106/252, 253

[56] References Cited

U.S. PATENT DOCUMENTS

| | | | |
|---|---|---|---|
| 134,323 | 12/1872 | Staling | 106/253 |
| 2,915,411 | 12/1959 | Schumacher et al. | 106/253 |
| 5,028,264 | 7/1991 | Miner | 106/253 |

FOREIGN PATENT DOCUMENTS

| | | | |
|---|---|---|---|
| 825568 | 4/1981 | U.S.S.R. | 524/313 |

OTHER PUBLICATIONS

Grant & Hackh's Chemical Dictionary, fifth edition, p. 372 Mc–Graw–Hill Book Co. N.Y., 1987.
Hawley's Condensed Chemical Dictionary, twelth edition, p. 473, Van Nostrand Reinhold Co.–N.Y., 1993.

Primary Examiner—Peter A. Szekely
Attorney, Agent, or Firm—Ohlandt, Greeley, Ruggiero & Perle, LLP; George W. Rauchfuss, Jr.

[57] ABSTRACT

A painting medium for artists is provided and is an essentially homogeneous admixture of raw drying oil and polymerized drying oil produced by mixing together in a heated state. A thinned version of this medium is provide by mixing an essential oil or alcohol solvent with the essentially homogeneous mixture of raw and polymerized drying oil. The essentially homoge-neous mixture of raw and polymerized drying oil is combined with an essential oil or solvent based varnish to produce an artist medium with improved drying properties permitting successive coats of the medium at be applied in relatively short periods of time without the coats or layers bleeding into one another.

32 Claims, No Drawings

PAINTING MEDIUM FOR ARTISTS

FIELD OF THE INVENTION

This invention relates to improved painting mediums and particularly improved painting mediums that when painted in a vertical position do not run and improved painting mediums that permit multiple coats to be applied in relatively short time periods without mixing or blending of the coats occurring and without having to wait for any significant period of time for underlying layers to dry before applying the next successive coat.

BACKGROUND OF THE INVENTION

Artists are always searching for new painting mediums with new or improved properties in order to permit them to produce new types of works and to do so in a much quicker time frame. For example, there is a need for an essentially clear painting medium that can be used with any pigment or colorant to produce colored medium of high quality without less of or diminution of brightness, luster, brilliance or color. A further goal of artists is to have a medium which when painted on surfaces permits almost immediate highlighting thereof and when painted vertically on painting surfaces do not run. It is a further desire of artists to have available a medium that can be covered over or crossed through after a very short period, e.g. an hour or less, with another application of another coating of such medium (but of a different color) without the colors mixing or the layers being disturbed by each other.

For an artist painting a picture requiring a multitude of various overlaying colored mediums it would be highly desirable that a suitable medium be available which would permit the artists to apply a number of layers of medium of varying colors or tints (e.g. four, five or more layers) without having to wait for any of the underlying layers to dry to completion before applying the next overlaying layer of colored medium.

One or more of these objects are obtained by the various mediums provided by the present invention.

SUMMARY OF THE INVENTION

An improved painting medium is provided in accordance with the present invention by the addition of a hot raw drying oil from plants or vegetable seeds to a hot polymerized drying oil from such plant or vegetable seeds to form an essentially homogenous mixture thereof Surprisingly, no resin is required to make the mixture useful as a painting medium. A further medium in accordance with this invention is provided by the mixing of such homogenous mixture with essential oil or alcohol solvents. It will also be appreciated that such mediums can be provided with any suitable pigment or colorant to provide a desired colored medium.

A further aspect of this invention comprises a medium comprising the essentially homogenous admixture of raw and polymerized drying oils with an essential oil or solvent based varnish. As with the previously mentioned medium any suitable pigment or colorant may be added thereto.

DETAILED DESCRIPTION OF THE INVENTION AND PREFERRED EMBODIMENTS

An improved medium for artists is provided according to this invention by preparing an essentially homogenous admixture of a raw drying oil with a polymerized drying oil by admixing these components in a heated state with mixing until the raw drying oil is substantially uniformly dispersed or fused into the polymerized drying oil. The mixing of the raw and polymerized drying oil occurs at a suitable elevated temperature, generally at a temperature of from about 200° F. to about 500° F. (93° C. to 260° C.), more preferably at a temperature from about 250° F. to about 300° F. (122° C. to 149° C.). The mixture of these two components under suitable heat to form a substantially uniform admixture provides a painting medium that when painted out in a vertical position does not run, and paint strokes painted side-by-side do not bleed into each other. This is rather surprising since raw drying oil (either with or without added pigment), when painted vertically, runs and bleeds, and polymerized drying oil is too thick to paint with and leaves an undesirable thick film.

The drying oil can be any suitable drying oil utilized for painting, such as drying oils from plant or vegetable seeds. As suitable drying oils there may be mentioned, for example, linseed oil, poppy seed oil, hempseed oil, walnut oil, tung oil, safflower oil, soya bean oil, pariela oil, orticica oil, candlenut oil, sunflower oil, tallow oil, tobacco seed oil, and the like and mixtures thereof Preferred as a drying oil of this invention are linseed oil, poppy seed oil, hempseed oil, walnut oil, tung oil and mixtures thereof. Especially preferred is linseed oil as the raw drying oil and polymerized linseed oil as the polymerized drying oil.

The weight ratio of raw drying oil to polymerized drying oil will generally be from about 5:1 to about 3:1, preferably about 2:1 to about 1:3 and more preferably from about 1:1 to about 1:3 and most preferably about 1:1. However, depending on the particular drying oil employed the general and preferred weight ratio may vary from the above stated ranges.

The polymerized drying oil employed in the medium of this invention can be any suitable polymerized drying oil, such as polymerized drying oil obtained by suitable heating of drying oil in a reaction vessel, stand oil, blown oil, or sun-thickened oil, i.e. drying oil thickened by exposure to the sun and air in open trays. Preferably, the polymerized drying oil is as light in color as possible and generally this is obtained by controlled heating of drying oil in a reaction vessel where it is heated until the oil polymerizes, e.g. at about 600° F. to about 675° F. (316° C. to 357° C.) for several hours until the oil thickens and polymerizes, after which the polymerized oil can be cooled to a temperature suitable for the addition of the raw drying oil, i.e., to a temperature generally within the range of about 200° F. to about 500° F. (93° C. to 260° C.)., However, as stated above, one can start with already polymerized drying oil, such as stand oil, and simply heat it up to the suitable temperature of about 200° F. to about 500° F. (93° C. to 260° C.) for adding the raw drying oil thereto in a heated state for preparing the essentially homogenous mixture of this invention.

The painting medium of this invention can be obtained in a variety of ways. For example, cold raw and polymerized drying oil can be heated together in a heated mixing vessel with stirring until the essentially homogenous admixture is obtained. Alternatively, as mentioned hereinbefore, one can produce polymerized drying oil by heating the drying oil to a suitable polymerization temperature to produce the polymerized drying oil component, cooling the polymerized oil to a suitable mixing temperature and adding cold or heated raw drying oil thereto with mixing until the raw oil is fused into the polymerized oil and the essentially homogeneous mixture of this invention is obtained. In a further embodiment, cold raw and polymerized drying oil can be added to a suitable vessel where they are heated together with stirring until the essentially homogeneous mixture of this invention is obtained.

Once the essentially homogenous admixture of raw drying oil and polymerized drying oil is obtained the admixture may be cooled to room temperature and stored for later use as a medium for artists. If desired, any suitable pigments, dyes or colorants may be added to the medium for use as colored mediums.

The outstanding quality and desirable properties of the mediums of this invention are demonstrated by the following test procedure. Using one's signature as a test example for medium paintability, mixing one part of the medium of this invention to one part pigment or tube color (oil), one can paint a four or five letter word like John or James with a paint brush on a smooth dry surface in a smooth ink-like fashion in a vertical position without running of the medium occurring. Additionally, the word is capable of being highlighted (outlined or shaded) by a second, differently colored medium without the stroke of one bleeding into the other. After only about an hour, a third color mixed with the medium of the invention can be crossed through the signature without the signature layer being disturbed.

A further aspect of this invention comprises the above-described medium of this invention thinned with an essential oil solvent or a suitable alcohol solvent. While the amount of solvent that may be mixed with the essentially homogenous admixture of raw drying oil and polymerized drying oil may vary quite widely over any suitable range, generally the weight ratio of essentially homogenous admixture to solvent will range from about 10:1 to about 1:2, preferably about 1:1.

Any suitable essential oil solvent usable in painting mediums may be mixed with the essentially homogenous admixture of raw and polymerized drying oil. As examples of suitable solvents these may be mentioned spirits of turpentine, petroleum distillate in the range of mineral spirits, spike of lavender, rosemary oil, naphtha and mixtures thereof, but is preferably mineral spirits. As an example of a suitable alcohol solvent there may be mentioned spirits of wine.

As specific examples of solvents that may be employed there may be mentioned, mineral spirits, a mixture of one part mineral spirits and two parts distilled gum turpentine, a mixture of one part mineral spirits with two parts spike of lavender, a mixture of one part mineral spirits and one part spirits of turpentine, and a mixture of one part mineral spirits, one part gum spirits of turpentine and one part spike of lavender, the parts being parts by weight.

The thinned essential oil solvent version of the painting medium of this invention is produced by reheating the essentially homogenous admixture of raw and polymerized drying oil (if already cooled and stored) to a temperature of generally about 300° F. (149° C.) and the essential oil solvent is added cold to the hot oil mixture, preferably in a weight ratio of about 1:1, and mixed to homogeneity. Thereafter, the thinned homogeneous mixture is cooled to room temperature and stored for later use.

A still further aspect of this invention comprises a painting medium for artists made by mixing the essentially homogenous mixture of raw and polymerized drying oil with an essential oil varnish or solvent based varnish which is free of drying oil. This form of medium is generally prepared only at the time of the intended use, e.g. on a palette or painting surface, and is not prepared and stored for later use.

Any suitable essential oil or solvent based varnish may be employed with the essentially homogenous admixture of raw and polymerized drying oil. The varnish will generally comprise a resin or balsam and an essential oil or suitable solvent. As examples of suitable resins in said varnishes there may be mentioned colophony, Venice turpentine, turpentine, damar, mastic, rosin oil, oleoresins, balsam, Strasbourg turpentine, sandarac, frankincense, elemi, shellac, copal amber, alkyd resins, acrylic resins, cellulosic materials, and the like and mixtures thereof Preferred resins are colophony, Venice turpentine, mastic, rosin oil, balsam. Strasbourg turpentine, sandarac and frankincense and mixtures thereof with balsam, and mastic being especially preferred. Any of the suitable essential oils previously mentioned may be present as the essential oil of the essential oil varnish. The essential oil is preferably mineral spirits or spirits of turpentine. The solvent for the solvent based varnishes is preferably an alcohol, particularly ethanol.

The essential oil or solvent based varnish may be mixed with the essentially homogeneous mixture of raw and polymerized drying oil in any suitable weight ratio, generally from about 2:1 to about 1:2, preferably at about 1:1. The user of this mixed medium will readily determine the optimum ratio of the varnish to the essentially homogeneous mixture of raw and polymerized drying oil by observing the congealing action of the resulting medium and adjusting the ratio so that as the medium is able to be painted on a non-absorbent painting surface with the congealing or drying action being sufficient to enable successive coats of differently colored media to be applied over each other in relatively short periods of time without the successive media bleeding into each other. This drying time period is observed generally by noting that, as the medium is applied to the painting surface with a brush, there is a point of time at which the brush begins to stick or pull the medium as the medium is spread over and congeals on the painting surface. When this occurs, a differently colored medium of this invention can be then applied over the first layer of medium without the two layers bleeding into each other. By suitably adjusting the weight ratio of varnish to the essentially homogeneous mixture of raw and polymerized drying oil the artist can determine the optimum drying time of the resultant mixture desired in order to obtain the afore-described effect.

As an example of the painting mediums of this invention there is provided the following exemplary but non limiting example.

In a 2000 ml flask, 1000 ml of raw linseed oil was heated at 600° to 675° F. (316°–357° C.) for about 2 hours or more until the oil thickens and polymerizes. Care is taken to ensure the oil does not overheat and darken. When the oil has thickened to about the viscosity of raw honey heating was terminated and cooling was permitted. At about 300° F. (149° C.) about 333 ml cold linseed oil (weight ratio of raw oil to polymerized oil about 1:3) was added to the hot polymerized oil and the mixture stirred until an essentially homogenous mixture thereof was obtained.

The essentially homogenous mixture of raw and polymerized oil was then divided into three equal portions. One portion was permitted to cool to room temperature and stored for later use as a painting medium for artists. To the second portion, cold mineral spirits was added to the 300° F. (149° C.) hot, essentially homogeneous oil mixture at a 1:1 ratio of mineral spirits to hot, essentially homogeneous oil mixture. The mineral spirits/oil mixture was then cooled to room temperature and stored for use as a painting medium. To the third portion, which is also permitted to cool to about room temperature and placed on a palette for use, an essential oil varnish of about 1 part by weight balsam and 2 parts by weight spirits of turpentine is added in a weight ratio of essential oil varnish to essentially homogenous raw and polymerized drying oil mixture of about 1:1. This medium is ready for immediate use as a painting medium. This last described medium produces an unusual and extremely useful effect. The mixture produces a buffered solvent type action whereby the medium can be placed on a non-absorbent painting surface and as soon as the brush begins to stick or pull the medium as it spreads the medium over the surface a state has been reached where a similar medium, but with a different pigment or colorant therein, can be placed over the first layer without the two layers of media bleeding together. It is possible to paint numerous layers of such colored mediums one atop the other, e.g. four or five layers or more, in a relatively short period of time. It is therefore possible to paint a multi-colored, multi-layered painting within the period of a single day, whereas, previously, an artist may have had to wait for many hours, even up to a day or longer, for each layer to dry sufficiently before a succeeding layer could be placed thereon.

The invention is illustrated but not limited by the foregoing description and examples. Those skilled in the art will envision many variations thereof without departing from the spirit and scope of the invention.

I claim:

1. An artist's painting medium consisting essentially of an essentially homogenous admixture of at least one raw drying oil with a polymerized drying oil, the raw oil and the polymerized drying oil having been uniformly mixed together at a temperature of at least about 200° F., the painting medium does not run when painted out in a vertical position and paint strokes thereof painted side-by-side do not bleed into each other.

2. A painting medium according to claim 1 wherein the weight ratio of raw drying oil mixed with polymerized drying oil is from about 2:1 to about 1:3 and the raw drying oil and polymerized drying oil are mixed together at a temperature of from about 200° F. to about 500° F. (93° C. to 260° C.).

3. A painting medium according to claim 2 wherein the ratio is about 1:1.

4. An artist's painting medium consisting essentially of an essentially homogenous admixture of at least one raw drying oil with a polymerized drying oil, the raw oil and the polymerized drying oil having been uniformly mixed together at a temperature of at least about 200° F. and wherein the raw drying oil and the polymerized drying oil are both selected from the group consisting of linseed oil, poppy seed oil, hempseed oil, walnut oil, tung oil, and mixtures thereof.

5. A painting medium according to claim 4 wherein the raw drying oil is linseed oil and the polymerized drying oil is polymerized linseed oil.

6. An artist's painting medium according to claim 4 wherein the weight ratio of raw drying oil mixed with polymerized drying oil is from about 2:1 to about 1:3 and the raw drying oil and polymerized drying oil are mixed together at a temperature of from about 200° F. to about 500° F. (93° C. to 260° C.) and wherein the raw drying oil is linseed oil and the polymerized drying oil is polymerized linseed oil.

7. A painting medium according to claim 3 wherein the raw drying oil is linseed oil and the polymerized drying oil is polymerized linseed oil.

8. A painting medium according to claim 4 additionally comprising a pigment.

9. A painting medium according to claim 6 additionally comprising a pigment.

10. A painting medium according to claim 7 additionally comprising a pigment.

11. A painting medium comprising the essentially homogenous admixture according to claim 1 additionally comprising a solvent selected from an alcohol, mineral spirits, naphtha and an essential oil solvent.

12. A painting medium according to claim 11 wherein the solvent is selected from the group consisting of spirits of turpentine, mineral spirits, spike of lavender, rosemary oil, naphtha, and mixtures thereof.

13. A painting medium according to claim 12 wherein the weight ratio of the essentially homogenous mixture of raw drying oil and polymerized drying oil to solvent is from about 10:1 to about 1:2.

14. A painting medium according to claim 13 wherein the ratio is about 1:1.

15. A painting medium according to claim 2 additionally comprising a solvent, wherein the weight ratio of the essentially homogenous mixture of raw drying oil and polymerized drying oil to solvent is from about 10:1 to about 1:2.

16. A painting medium according to claim 6 additionally comprising a solvent, wherein the weight ratio of the essentially homogenous mixture of raw drying oil and polymerized drying oil to solvent is about 1:1.

17. A painting medium according to claim 9 additionally comprising a solvent, wherein the weight ratio of the essentially homogenous mixture of raw drying oil and polymerized drying oil to solvent is from about 10:1 to about 1:2.

18. A painting medium according to claim 10 additionally comprising a solvent, wherein the weight ratio of the essentially homogenous mixture of raw drying oil and polymerized drying oil to solvent is from about 10:1 to about 1:2.

19. A painting medium according to claim 13 wherein the solvent is mineral spirits and the weight ratio of the essentially uniform mixture of raw drying oil and polymerized drying oil to mineral spirits is about 1:1.

20. A painting medium according to claim 17 wherein the solvent is mineral spirits and the weight ratio of the essentially uniform mixture of raw drying oil and polymerized drying oil to mineral spirits is about 1:1.

21. A painting medium according to claim 18 wherein the solvent is mineral spirits and the weight ratio of the essentially uniform mixture of raw drying oil and polymerized drying oil to mineral spirits is about 1:1.

22. An artist's painting medium comprising an essentially homogenous admixture of at least one raw drying oil with a polymerized drying oil, the raw oil and the polymerized drying oil having been uniformly mixed together at a temperature of at least about 200° F. and wherein the raw drying oil and the polymerized drying oil are both selected from the group consisting of linseed oil, poppy seed oil, hempseed oil, walnut oil, tuna oil, and mixtures thereof, and additionally comprising an essential oil or solvent based varnish free of drying oil.

23. A painting medium according to claim 22 wherein the varnish is an essential oil varnish and comprises a mixture of resin and an essential oil wherein the resin is selected from the group consisting of colophony, Venice turpentine, mastic, rosin oil, balsam, Strasbourg turpentine, sandarac, frankincense, and mixtures thereof and the essential oil is selected from the group consisting of spirits of turpentine spike of lavender, rosemary oil, and mixtures thereof.

24. A painting medium according to claim 22 wherein the weight ratio of varnish to the essentially homogenous admixture of raw drying oil and polymerized drying oil is about 3:1 to about 1:3.

25. A painting medium according to claim 23 wherein the weight ratio of essential oil varnish to the essentially homogenous admixture of raw drying oil and polymerized drying oil is about 3:1 to about 1:3.

26. A painting medium according to claim 24 wherein the weight ratio of raw drying oil mixed with the polymerized drying oil is from about 2:1 to about 1:3 and the raw drying oil and polymerized drying oil are mixed together at a temperature of from about 200° F. to about 500° F. (93° C. to 260° C.) and wherein the raw drying oil is linseed oil and the polymerized drying oil is polymerized linseed oil.

27. A painting medium according to claim 26 additionally comprising a pigment.

28. A painting medium according to claim 26 wherein the varnish is an essential oil varnish and comprises a mixture of resin and an essential oil wherein the resin is selected from the group consisting of colophony, Venice turpentine, mastic, rosin oil, balsam, Strasbourg turpentine, sandarac, frankincense, and mixtures thereof and the essential oil is selected from the group consisting of spirits of turpentine, spike of lavender, rosemary oil, and mixtures thereof.

29. A painting medium according to claim 27 wherein the varnish is an essential oil varnish and comprises a mixture of resin and an essential oil wherein the resin is selected from the group consisting of colophony, Venice turpentine, mastic, rosin oil, balsam, Strasbourg turpentine, sandarac, frankincense, and mixtures thereof and the essential oil is selected from the group consisting of spirits of turpentine, spike of lavender, rosemary oil, and mixtures thereof.

30. A painting medium according to claim 28 wherein the weight ratio of essential oil varnish to the essentially homogenous admixture of raw drying oil and polymerized drying oil is about 3:1 to about 1:3.

31. A painting medium according to claim 29 wherein the weight ratio of essential oil varnish to the essentially homogenous admixture of raw drying oil and polymerized drying oil is about 3:1 to about 1:3.

32. A painting medium according to claim 28 wherein the weight ratio of essential oil varnish to the essentially homogeneous admixture of raw drying oil and polymerized drying oil is about 1:1 and the essential oil varnish comprises balsam and spirits of turpentine.

* * * * *